United States Patent [19]

Nakamura

[11] 4,298,978
[45] Nov. 3, 1981

[54] DATA COMMUNICATION APPARATUS
[75] Inventor: Haruka Nakamura, Tokyo, Japan
[73] Assignee: Ricoh Company, Ltd., Tokyo, Japan
[21] Appl. No.: 124,996
[22] Filed: Feb. 26, 1980
[30] Foreign Application Priority Data
  Mar. 6, 1979 [JP] Japan ................................ 54-26444
[51] Int. Cl.³ ............................................. H04J 6/00
[52] U.S. Cl. ..................................... 370/92; 370/48; 370/82
[58] Field of Search ...................... 370/92, 94, 89, 48, 370/82, 83, 99; 340/147 MD

[56] References Cited
U.S. PATENT DOCUMENTS
3,207,851  9/1965  Fukinuki ............................. 370/99
3,396,239  8/1968  Yamauchi ........................... 370/48
4,071,706  1/1978  Warren ............................... 370/89
4,168,400  9/1979  de Couasnon et al. ............. 370/89

Primary Examiner—Douglas W. Olms
Attorney, Agent, or Firm—David G. Alexander

[57] ABSTRACT

A group of address signals is constituted by a start bit followed by a predetermined number of address bits and a stop bit. A group of data signals preceding another group of data signals is constituted by a start bit followed by the same predetermined number of data bits and a stop bit. A group of data signals preceding a group of address signals is constituted by a start bit followed by the predetermined number of data bits and two stop bits. At the receiving end, as a group of signals is received, a bit corresponding to the predetermined number plus three is sensed. If the sensed bit is a start bit, the next group is processed as a group of data signals. If the sensed bit is a stop bit, the next group is processed as a group of address signals.

6 Claims, 12 Drawing Figures

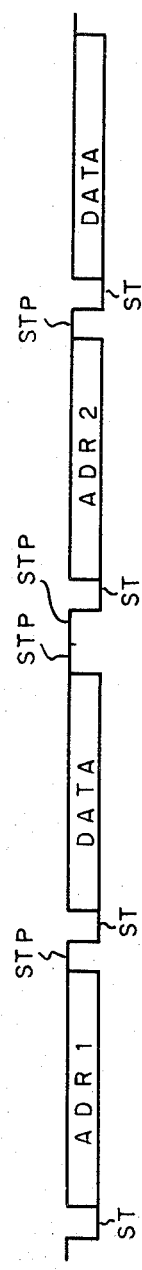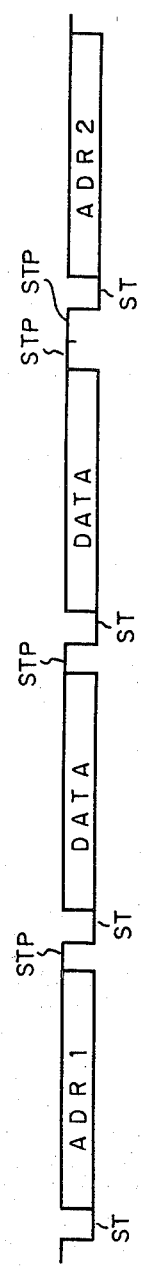

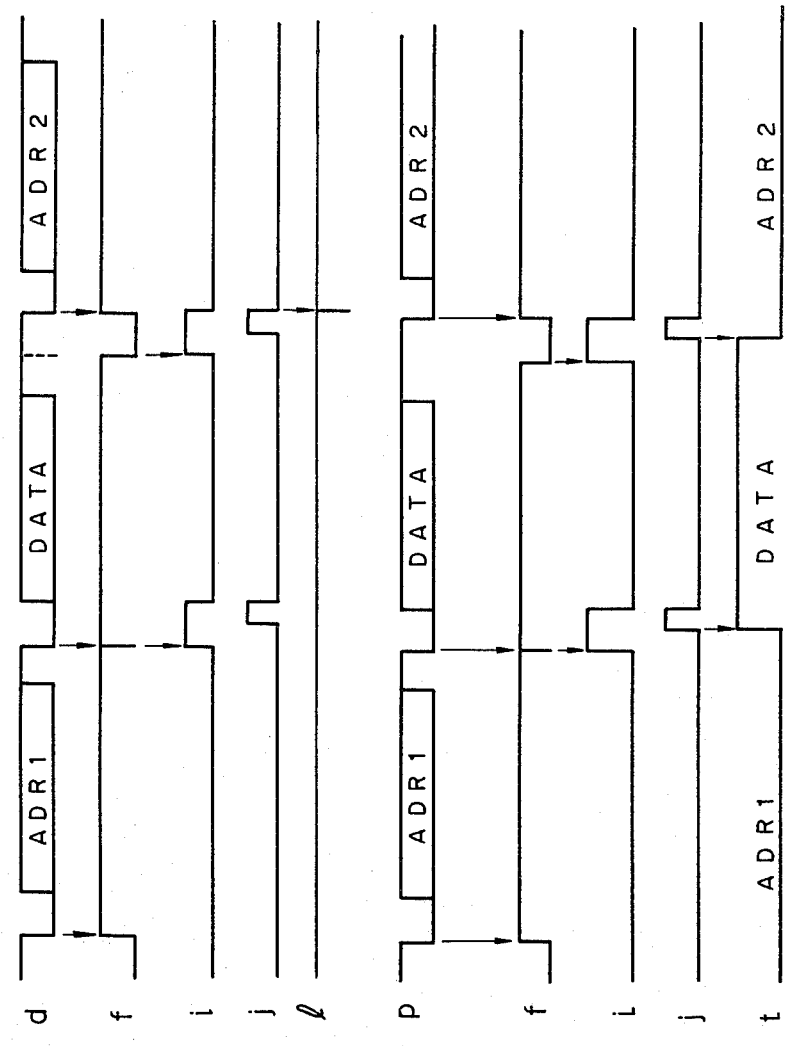

DATA COMMUNICATION APPARATUS

BACKGROUND OF THE INVENTION

The present invention relates to a serial data communication apparatus for a time sharing computer system or the like having a plurality of transceivers.

In such a system, a main or key station such as a central processing unit of a computer communicates with a plurality of local stations or units for data communication. The procedure is for the main station or unit to first transmit an address code indicating the local unit which is to receive the transmission and then transmit the desired data. Only the local station corresponding to the address code is energized to receive the transmission.

Whether transmission is on a character by character basis or a block by block basis, some means must be provided to discriminate the address codes from data.

Conventionally, the address codes are preceded by a special address identification code which indicates that the following group of signal bits constitutes an address code. A start code is generated preceding each character or block of data and an end code is generated following the data.

The conventional systems are unnecessarily low in transmission speed due to the fact that so many identifier codes must be transmitted along with the actual data.

SUMMARY OF THE INVENTION

A data communication apparatus embodying the present invention comprises transmission means for selectively transmitting groups of address signals and groups of data signals, each group of address signals comprising a start bit, a predetermined number of address bits and a stop bit, each group of data signals preceding another group of data signals comprising a start bit, said predetermined number of data bits and a stop bit, each group of data signals preceding a group of address signals comprising a start bit, said predetermined number of data bits and two stop bits, and reception means for receiving groups of signals, the reception means comprising sensor means for sensing, in a group of signals, a bit following said predetermined number of bits plus two bits and processing a next group of signals as a group of address signals when said sensed bit is a stop bit and processing said next group of signals as a group of data signals when said sensed bit is a start bit.

In accordance with the present invention, a group of address signals is constituted by a start bit followed by a predetermined number of address bits and a stop bit. A group of data signals preceding another group of data signals is constituted by a start bit followed by the same predetermined number of data bits and a stop bit. A group of data signals preceding a group of address signals is constituted by a start bit followed by the predetermined number of data bits and two stop bits. At the receiving end, as a group of signals is received, a bit corresponding to the predetermined number plus three is sensed. If the sensed bit is a start bit, the next group is processed as a group of data signals. If the sensed bit is a stop bit, the next group is processed as a group of address signals.

It is an object of the present invention to provide a data communication apparatus which operates at increased speed compared to the prior art.

It is another object of the present invention to increase the speed of data transmission by minimizing a number of required identification codes.

It is another object of the present invention to provide a generally improved data communication apparatus.

Other objects, together with the foregoing, are attained in the embodiment described in the following description and illustrated in the accompanying drawing.

BRIEF DESCRIPTION OF THE DRAWING

FIGS. 3 and 4 are diagrams illustrating data communication in accordance with the present invention;

FIG. 7 is a timing diagram illustrating the operation of the transmission unit;

FIG. 8 is a timing diagram illustrating the operation of the reception unit;

DESCRIPTION OF THE PREFERRED EMBODIMENT

While the data communication apparatus of the present invention is susceptible of numerous physical embodiments, depending upon the environment and requirements of use, substantial numbers of the herein shown and described embodiment have been made, tested and used, and all have performed in an eminently satisfactory manner.

Figure 1:
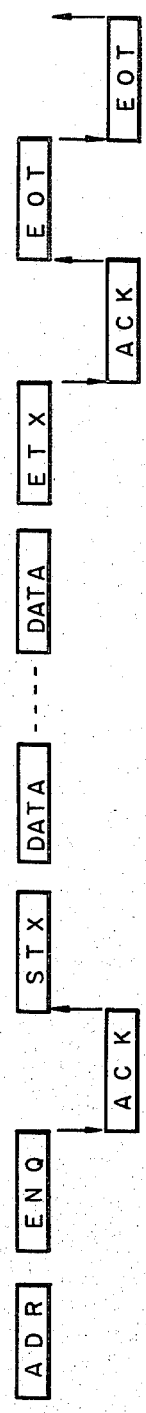
FIGS. 1 and 2 are diagrams illustrating prior art data communication.

Referring now to the drawing, FIG. 1 illustrates a prior art method of data communication. A main unit or key station first transmits an address ADR of a local unit or station to which it is desired to transmit data followed by an enquire signal ENQ. If the local station is prepared to receive data, it transmits back an acknowledge signal ACK. Then, the main station transmits a start of data signal STX and transmits the data which is designated as DATA. At the end of transmission of DATA, the main station transmits an end of data signal ETX. In response, the local station sends back an acknowledge signal ACK. The main station sends an end of transmission signal EOT after which the local station sends back the signal EOT and the stations break communication.

The prior art system of FIG. 1 is slow because of the large number of identification signals ENQ, ACK, STX, ETX and EOT which must be transmitted along with the actual DATA. In spite of this, the system has been popular for station to station communication using telephone lines in which the data is in block form since the amount of data signals is large compared to the auxiliary signals. However, the system is unacceptable for transmission of extremely short data such as in a time sharing multiplex system as used in remote terminal computer systems.

Figure 2:
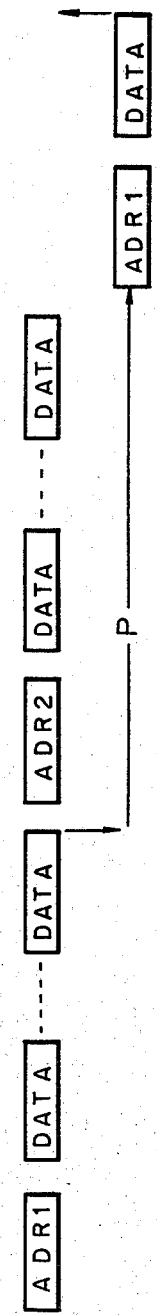

FIG. 2 illustrates another prior art system which is more suitable for time sharing applications. An address of a first local station ADR1 is transmitted followed by data. The main station or computer facility does not wait for any response from the local station or terminal which processes the received data. After transmission of the first data, the main station transmits the address ADR2 of another station and then the appropriate data. The first local station processes the received data during a time P and the transmits its own address ADR1 followed by a response to the received data. The data exchanged between the stations may be actual computational or other data or merely data concerning the status of the local station.

FIGS. 3 and 4 illustrate the improved data communication system of the present invention which greatly reduces the number of auxiliary codes and increases the transmission speed. In accordance with the present invention, each group of address signals comprises a single logically low start bit ST and followed by a predetermined number of address bits and a logically high stop bit STP. Each group of data signals which precedes another group of data signals comprises a start bit ST, the same predetermined number of data bits and a stop bit STP. Each group of data signals which precedes a group of address signals comprises a start bit ST followed by the predetermined number of data bits and two stop bits STP. Thus, in accordance with the present invention, if a group of data signals comprises one stop bit, it indicates that the next group of signals will be a group of data signals. If, however, a group of data signals comprises two stop bits, it indicates that the following group of signals will be a group of address signals. Typically, the predetermined number will equal nine and consist of an eight bit address code plus a parity bit in the case of a group of address signals and an eight bit data code (alphanumeric, function, etc.) plus a parity bit in the case of a group of data signals. Thus, each group of signals (address or data) which precedes a group of data signals will consist of eleven bits. Each group of data signals which precedes a group of address signals will consist of twelve bits due to the extra stop bit.

Figure 5:
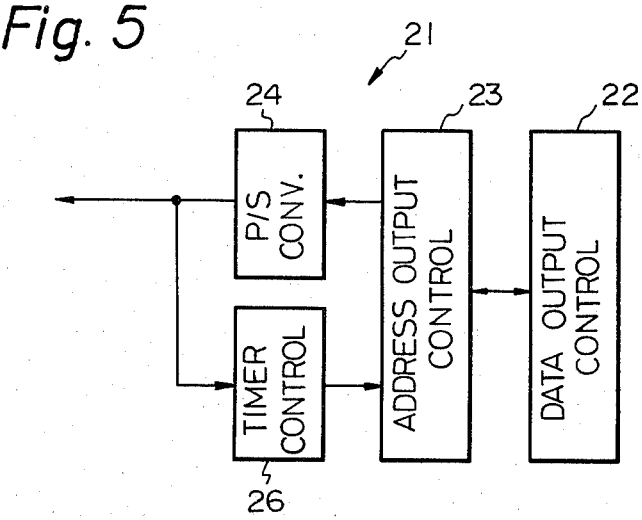
FIG. 5 is a simplified block diagram of a transmission unit of the present invention.
Figure 6:
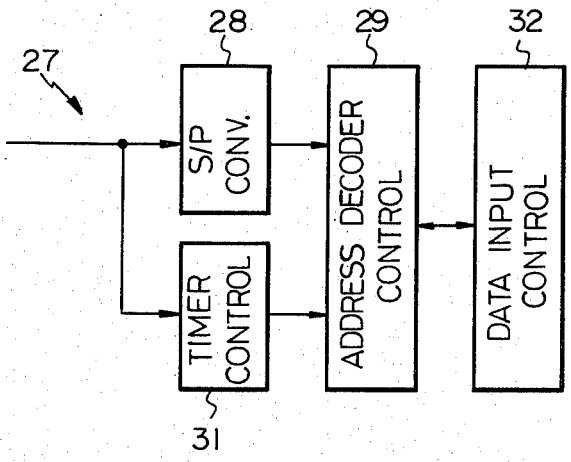
FIG. 6 is a simplified block diagram of a reception unit of the present invention.

A data communication apparatus embodying the present invention comprises a transmission unit which is shown in FIG. 5 and a reception unit which is shown in FIG. 6. The two units may be combined at each station to constitute a transceiver.

The transmission unit is shown in FIG. 5 and generally designated by the reference numeral 21. The unit 21 comprises a data output control unit 22 for generating groups of data signals, an address output control unit 23 for generating groups of address signals and selectively passing the data signals and address signals to a parallel to serial converter 24 and a timer control unit 26 for counting and sensing the bits of the groups of signals. The operation of the transmission unit 21 will now be described with reference also being made to FIG. 7.

As will be described in detail below, the timer control unit 26 comprises a first counter for counting 11 bits and a second counter for counting the 12th bit. The first counter produces a high signal f for the first 11 bits and the second counter produces a high signal i for the 12th bit. If the next group of signals is a group of data signals, the 12th bit will be a logically low start bit. If the next group of signals is a group of address signals, the 12th bit will be a logically high stop signal. The first counter is triggered by the leading (falling) edge of a stop bit. The second counter is triggered by an overflow pulse of the first counter which corresponds to the falling edge of the signal f.

The timer control unit 26 further comprises a third counter which generates a sample pulse j at a time corresponding to the 12th bit of the present group of signals. Thus, the 12th bit is sampled in response to the leading (rising) edge of the sample pulse j. If the 12th bit is logically high, corresponding to a stop pulse, an address load signal e will momentarily go low in coincidence with the falling edge of the sample pulse j. If the 12th bit is logically low, corresponding to a start pulse, the address load signal e will remain logically high.

If the address load signal e goes low, the address output control 23 will load and output a group of address pulses as the next group of pulses. If the address load signal e does not go low, the address output control 23 will gate a group of data signals therethrough to the converter 24 as the next group of pulses.

The reception unit is illustrated in FIG. 6 and generally designated as 27. The unit 27 comprises a serial to parallel converter 28, the output of which is connected to an address decoder control unit 29. The received groups of signals are also applied to a timer control unit 31 which has an output connected to the unit 29. The output of the unit 29 is connected to a data input control unit 32. The units 22 and 32 typically comprise buffer memories and may be integral in a transceiver installation, along with other components of the units 21 and 27.

With reference also being made to FIG. 8, the timer control unit 31 is similar to the unit 26 and comprises a first counter is triggered by a received start bit and produces the signal f. Second and third counters produce the signals i and j respectively in the manner described above for the unit 21. The 12th bit is sensed at the leading edge of the sample pulse j. If the 12th bit is logically low, corresponding to a start signal, a data receive signal t goes high indicating that the next group of signals is data. Conversely, if the next group of signals is an address, the data receive signal t goes low. If the signal t is high, the unit 31 will control the unit 29 to gate the next group of data signals to the unit 32. If the signal t is low, the unit 29 will be controlled to prevent the next group of signals from being gated to the unit 32 and decode the next group of signals as an address. If the address corresponds to that of the unit 27, the following group of signals, which must be data, will be gated to the unit 32.

Figure 9:
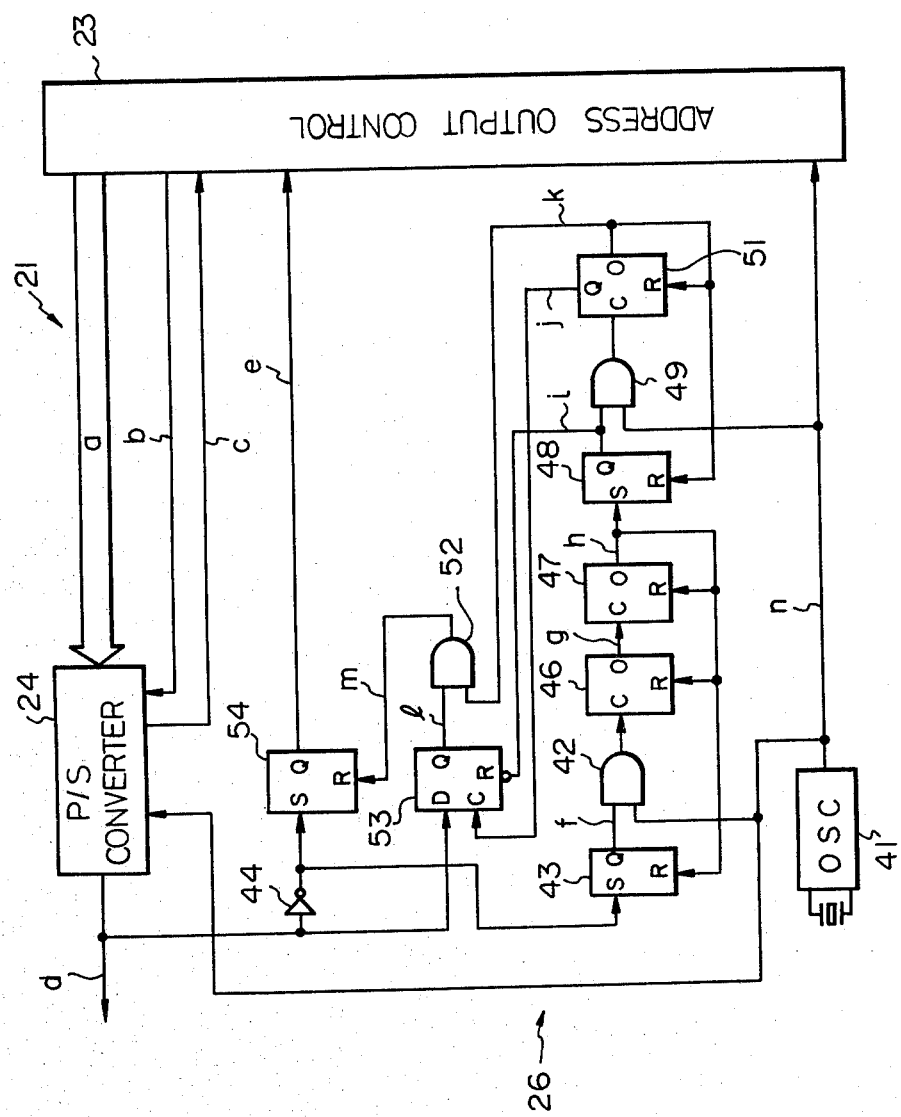
FIG. 9 is a diagram illustrating the transmission unit in greater detail.
Figure 10:
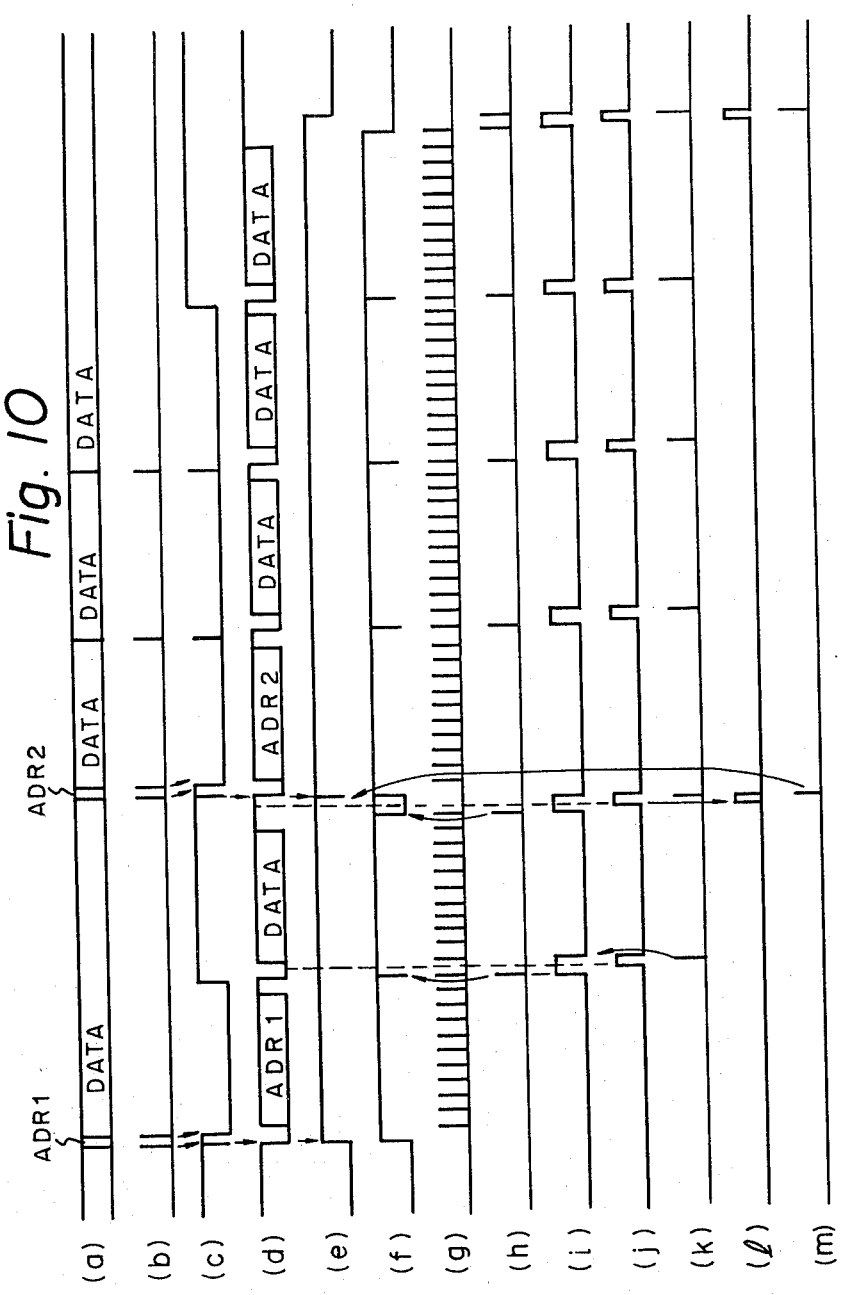
FIG. 10 is a timing diagram illustrating the operation of the transmission unit in greater detail.

The transmission unit 21 will now be described in greater detail with reference being made to FIGS. 9 and 10.

An address and data signal bus from the unit 23 to the unit 24 is designated as a. The serial output of the unit 24 is designated as d. A load strobe is designated as b whereas a buffer ready flag is designated as c.

The unit 21 comprises a crystal controlled clock pulse generator or oscillator 41 which produces clock pulses n at a frequency much higher than the bit transmission rate of the apparatus. The clock pulses n are applied to a frequency divider (not shown) in the converter unit 24 and a similar frequency divider in the unit 23 for system synchronization. The clock pulses n are also applied to an input of an AND gate 42.

The output signals d are applied to the set input of a set-reset flip-flop 43 through an inverter 44. Thus, the flip-flop 43 is set by the leading (falling) edge of the logically low start bit which is the first bit of a group of data or address signals. The Q output of the flip-flop 43 goes high and constitutes the signal f. The first counter mentioned above is constituted by the flip-flop 43, AND gate 42, a counter 46 and a counter 47.

The high signal f enables the AND gate 42 which gates the clock pulses n to the clock input of the counter 46. The counter 46 has a modulo equal to the number of clock pulses n in each data bit. Thus, the counter 46 produces an overflow output g for each bit for a group of signals.

The counter 47 counts the signals g and has a modulo of 11. Thus, the counter 47 will produce an overflow signal h after counting the 11th bit after the start bit. The signal h is fed back to reset inputs of the flip-flop 43 and counters 46 and 47 to reset the counters 46 and 47 to zero and reset the flip-flop 43. The Q output of the flip-flop 43 goes low, inhibiting the AND gate 42 and preventing further clock pulses n from being applied to the count inputs thereof.

The output of the counter 47 is connected to the set input of a set-reset flip-flop 48, the Q output of which is connected to an input of an AND gate 49. The clock pulses n are applied to another input of the AND gate 49, the output of which is connected to the count or clock input of a counter 51. The Q output of the flip-flop 48 constitutes the signal i. The second counter mentioned above is constituted by the flip-flop 48, AND gate 49 and counter 51. Another section of the counter 51 constitutes the third counter.

The signal i goes high at the leading edge of the 12th bit and enables the AND gate 49 to gate the clock pulses n to the count input of the counter 51. The modulo of the counter 51 is selected to be equal to the number of clock pulses in one signal bit and produces an overflow signal k to reset the counter 51 and the flip-flop 48 to inhibit the AND gate 49 and prevent further counting of the counter 51 from zero. The counter 51 also produces a high signal j when the count in the counter 51 reaches a value so as to correspond to the center of the 12th data bit. The output j may be constituted by the output of the highest order stage in the counter 51.

The signal j is applied to the clock input of a D-type flip-flop 53. The output signals d are applied to the D input of the flip-flop 53. The flip-flop 53 is clocked by the leading edge of the signal j, in the center of the 12th signal bit. If the 12th bit is a stop bit, the flip-flop 53 will be set and produce a logically high Q output. If the 12th bit is a start bit, the flip-flop 53 will remain reset and produce a low Q output. The Q output of the flip-flop 53 is designated as l and corresponds to the logical sense of the 12th signal bit.

The signal l is applied to an input of an AND gate 52, the output of which is designated as m and applied to the reset input of a set-reset flip-flop 54. The output of the inverter 44 is applied to the set input of the flip-flop 54, the output of which constitutes the address load signal e.

The flip-flop 54 is normally set by the leading edge of each start bit. The overflow signal k is applied to the AND gate 52 as an enable signal. If the signal l is low, the signal m will be low and the signal e will remain high. However, if the signal l is high, the output signal m of the AND gate 52 will go high for the duration of the signal k. The high signal m causes unconditional reset of the flip-flop 54 causing the signal e to go low. The flip-flop 54 is set by the next start bit. Thus, the address load signal e goes low for a brief duration in the desired manner.

The signal i is applied to an inverting reset input of the flip-flop 53 so that the flip-flop 53 is reset by the trailing edge of the signal i. However, the signal i will remain high for the duration of the signal k in the desired manner since the leading edge of the signal k causes the input stage of the flip-flop 48 to change over but the output stage of the flip-flop 48 does not change over until the trailing edge of the signal k.

If the address load signal remains low, the unit 23 gates a group of data signals to the unit 24 for transmission. If the address load signal e goes low, the unit 23 feeds a group of address signals to the unit 24. In either case, the buffer ready flag c is monitored by the unit 23 which generates the load strobe b when the buffer ready flag c goes high. In response to the load strobe b, the group of data signals or address signals is loaded into the converter unit 24.

Figure 11:
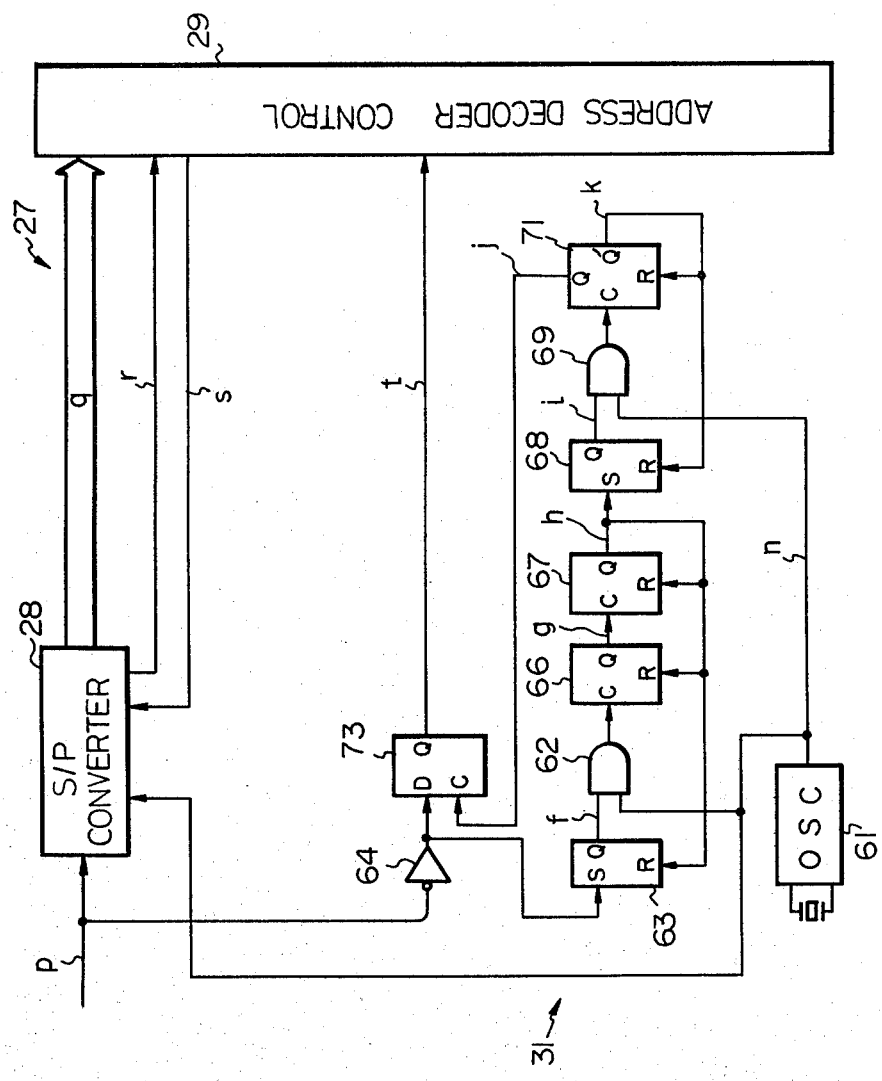
FIG. 11 is a diagram illustrating the reception unit in greater detail.
Figure 12:
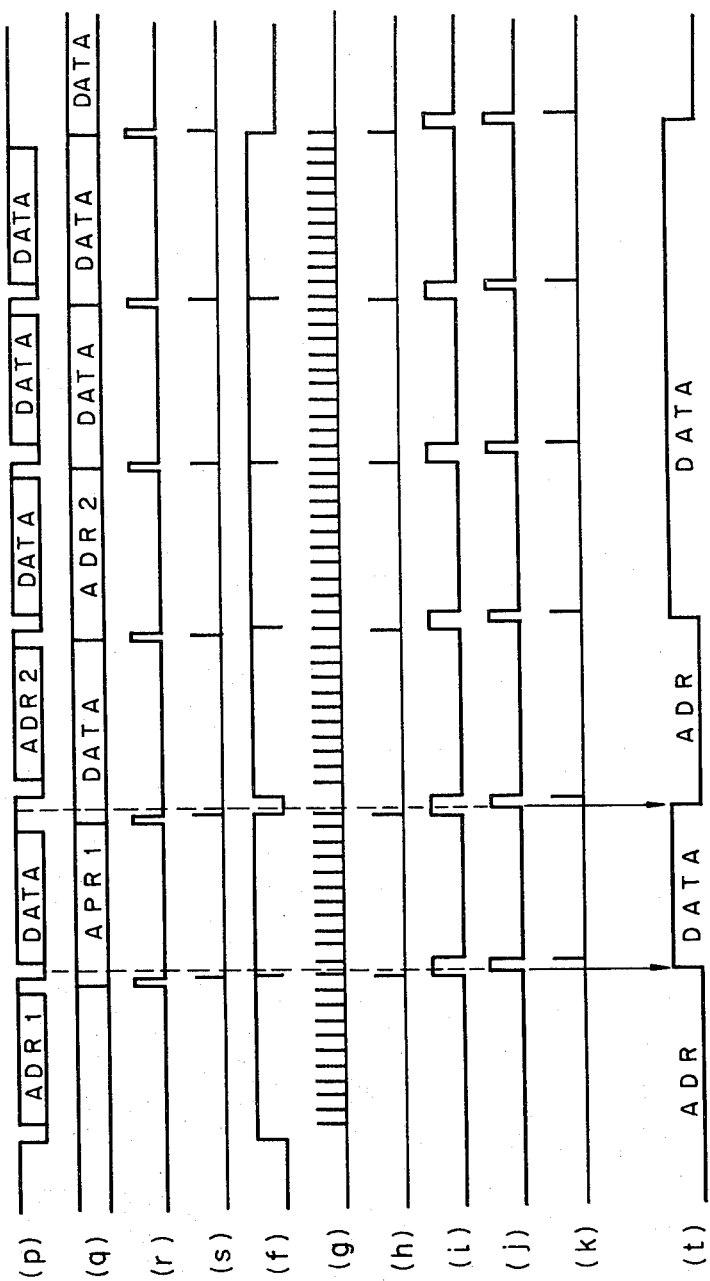
FIG. 12 is a timing diagram illustrating the operation of the reception unit in greater detail.

The reception unit 27 will now be described in greater detail with reference being made to FIGS. 11 and 12.

An address and data signal bus from the unit 28 to the unit 29 is designated as q. The serial input of the unit 28 is designated as p. A reset strobe is designated as s whereas a data ready flag is designated as r.

The unit 27 comprises a crystal controlled clock pulse generator or oscillator 61 which produces clock pulses n at a frequency much higher than the bit transmission rate of the apparatus. The clock pulses n are applied to a frequency divider (not shown) in the converter unit 28 and a similar frequency divider in the unit 29 for system synchronization. The clock pulses n are also applied to an input of an AND gate 62.

The input signals p are applied to the set input of a set-reset flip-flop 63 through an inverter 64. Thus, the flip-flop 63 is set by the leading (falling) edge of the logically low start bit which is the first bit of a group of data or address signals. The Q output of the flip-flop 63 goes high and constitutes the signal f.

The high signal f enables the AND gate 62 which gates the clock pulses n to the clock input of a counter 66. The counter 66 has a modulo equal to the number of clock pulses n in each data bit. Thus, the counter 66 produces an overflow output g for each bit of a group of signals.

A counter 67 counts the signals g and has a modulo of 11. Thus, the counter 67 will produce an overflow signal h after counting the 11th bit after the start bit. The signal h is fed back to reset inputs of the flip-flop 63 and counters 66 and 67 to reset the counters 66 and 67 to zero and reset the flip-flop 63. The Q output of the flip-flop 63 goes low, inhibiting the AND gate 62 and preventing further clock pulses n from being applied to the count inputs thereof.

The output of the counter 67 is connected to the set input of a set-reset flip-flop 68, the Q output of which is connected to an input of an AND gate 69. The clock pulses n are applied to another input of the AND gate 69, the output of which is connected to the count or clock input of a counter 71. The Q output of the flip-flop 68 constitutes the signal i.

The signal i goes high at the leading edge of the 12th bit and enables the AND gate 69 to gate the clock pulses n to the count input of the counter 71. The modulo of the counter 71 is selected to be equal to the number of clock pulses in one signal bit and produces an overflow signal k to reset the counter 71 and the flip-flop 68 to inhibit the AND gate 69 and prevent further counting of the counter 71 from zero. The counter 71 also produces a high signal j when the count in the counter 71 reaches a value so as to correspond with the center of the 12th data bit. The output j may be constituted by the output of the highest order stage in the counter 71.

The signal j is applied to the clock input of a D-type flip-flop 73. The input signals p are applied to the D input of the flip-flop 73 through the inverter 64. The flip-flop 73 is clocked by the leading edge of the signal j, in the center of the 12th signal bit. If the 12th bit is a stop bit, the flip-flop 73 will be reset and produce a logically low Q output. If the 12th bit is a start bit, the flip-flop 73 will be set and produce a high Q output. The Q output of the flip-flop 73 is designated as t and corresponds to the inversion of the 12th signal bit. The signal t constitutes the data receive signal.

If the data receive signal t is high, the unit 28 gates the next group of data signals to the unit 29 for processing. If the data receive signal t is low, the unit 29 decodes the next group of address signals.

When a group of signals has been processed by the unit 28, the unit 28 produces the data ready signal r which causes the signals to be fed in parallel to the unit 29. After transfer, the unit 29 feeds the reset strobe s to the unit 28 causing the unit 28 to be cleared.

In summary, it will be seen that the present invention greatly increases the speed and reliability of data communication using a simplified apparatus. Various modifications will become possible for those skilled in the art after receiving the teachings of the present disclosure without departing from the scope thereof. For example, preceding a group of address signals with one stop bit and preceding a group of data signals with two stop bits would constitute mere interchangeability of the arrangement described above and would be well within the scope of the present invention. Another obvious modification would be to precede a group of address pulses with more than two stop bits. It is also clear that replacing the counter arrangements with alternative timer means such as monostable multivibrators would also be well within the scope of the present invention.

What is claimed is:

1. A data communication apparatus comprising: transmission means for selectively transmitting groups of address signals and groups of data signals, each group of address signals comprising a start bit, a predetermined number of address bits and a stop bit, each group of data signals preceding another group of data signals comprising a start bit, said predetermined number of data bits and a stop bit, each group of data signals preceding a group of address signals comprising a start bit, said predetermined number of data bits and two stop bits; and reception means for receiving groups of signals, the reception means comprising sensor means for sensing, in a group of signals, a bit following said predetermined number of bits plus two bits and processing a next group of signals as a group of address signals when said sensed bit is a stop bit and processing a next group of signals as a group of data signals when said sensed bit is a start bit.

2. An apparatus as in claim 1, in which the sensor means comprises timer means for generating a sample signal at a time corresponding to said sensed bit, the sensor means sensing said sensed bit in response to the sample signal.

3. An apparatus as in claim 2, in which the timer means comprises clock pulse generator means for generating clock pulses and counter means for counting the clock pulses.

4. An apparatus as in claim 3, in which the sample signal is constituted by a high order stage output signal of the counter means.

5. An apparatus as in claim 2, in which the sensor means comprises a D-type flip-flop having a D input connected to receive the groups of signals and a clock input connected to receive the sample signal.

6. An apparatus as in claim 3, in which the counter means comprises a counter for counting the clock pulses, an AND gate having an input connected to receive the clock pulses and an output connected to a clock input of the counter, the counter means further comprising a flip-flop having an output connected to an input of the AND gate, the flip-flop being set by a start bit to enable the AND gate and reset by an overflow signal of the counter to inhibit the AND gate.

* * * * *